United States Patent
Jaquette

(10) Patent No.: US 7,684,143 B2
(45) Date of Patent: Mar. 23, 2010

(54) APPARATUS, SYSTEM, AND METHOD FOR LIMITING FRAME SPACING ERROR DURING TIMING-BASED SERVO PATTERN FABRICATION

(75) Inventor: Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/040,531

(22) Filed: Feb. 29, 2008

(65) Prior Publication Data

US 2009/0219648 A1    Sep. 3, 2009

(51) Int. Cl.
*G11B 5/584*   (2006.01)
*G11B 21/02*   (2006.01)
*G11B 5/09*    (2006.01)

(52) U.S. Cl. .................. 360/77.12; 360/75; 360/48; 360/53

(58) Field of Classification Search .............. None
See application file for complete search history.

(56) References Cited

U.S. PATENT DOCUMENTS

| 6,522,490 | B1 | 2/2003 | Cates et al. | 360/48 |
| 6,879,457 | B2 * | 4/2005 | Eaton et al. | 360/75 |
| 2005/0219734 | A1 | 10/2005 | Rothermel et al. | 360/75 |
| 2005/0254163 | A1 | 11/2005 | Nakao | 360/77.12 |
| 2008/0174897 | A1 * | 7/2008 | Bates et al. | 360/48 |
| 2008/0186610 | A1 * | 8/2008 | Bui et al. | 360/55 |
| 2008/0198500 | A1 * | 8/2008 | Weber et al. | 360/77.02 |
| 2008/0239559 | A1 * | 10/2008 | Goker et al. | 360/77.12 |

* cited by examiner

*Primary Examiner*—Andrew L Sniezek
(74) *Attorney, Agent, or Firm*—Kunzler & McKenzie

(57) ABSTRACT

An apparatus, system and method to limit frame spacing error during timing-based servo pattern fabrication. An apparatus in accordance with the invention may include a first servo write head to simultaneously write servo stripes onto a first servo frame of a magnetic tape, and a second servo write head to simultaneously write servo stripes onto a successive servo frame of the magnetic tape. The first and second servo write heads may write the stripes substantially concurrently to minimize spacing error between the frames.

20 Claims, 6 Drawing Sheets

APPARATUS, SYSTEM, AND METHOD FOR LIMITING FRAME SPACING ERROR DURING TIMING-BASED SERVO PATTERN FABRICATION

BACKGROUND OF THE INVENTION

1. Field of the Invention

The invention relates to timing-based servo tape formatting. Specifically, the invention relates to apparatus, systems and methods for limiting frame spacing error during timing-based servo pattern fabrication.

2. Description of the Related Art

Timing-based servo systems are commonly implemented to align recording heads during read/write operations. These systems are key to enabling increased data storage density, as they provide precise track-following capabilities across closely spaced tracks. This ability to stay "on track" facilitates the ability of the industry to move to higher and higher track densities.

During the manufacturing process, timing-based servo bands are written to tape by a servo write head and used as a reference to position data tracks. Each servo band includes a pattern of repeating servo frames along a length of the tape. A servo frame includes multiple servo bursts, or groups of servo stripes, where each burst is written at an angle with respect to a consecutive burst.

The servo write head used to write the servo pattern to tape is normally lithographically fabricated to mirror a single servo sub-frame having two opposing servo stripes. The pattern is embossed onto the tape by pulsing the write head a predetermined number of times to create the bursts. For example, a typical servo frame includes an A burst, a B burst, a C burst and a D burst. The A and B bursts normally include five stripes each, while the C and D bursts contain four stripes. Traditionally, therefore, a servo write head pulses five times to simultaneously emboss the A and B bursts, and then pulses four times to emboss the C and D bursts. Spacing between frames and sub-frames is precisely controlled by tape speed and pulse timing.

Some variance in frame spacing is inevitable, however, due mechanical tolerances and fluctuations in tape speed and tension. This variance may be exacerbated where extremely thin magnetic tape is used to maximize the amount of data that can be stored on a reel. Indeed, reduced tape thickness can increase tape sensitivity to variations in speed as the tape is transported from reel to reel.

Recent developments in servo system technology have been directed to reducing an incidence of frame spacing error by modifying the servo write head used to create the servo pattern. One system, for example, teaches simultaneously embossing three servo stripes per frame to create an "N" pattern of servo bursts. This system effectively reduces an opportunity for spacing variances between sub-frames by fixing a distance between B and C bursts, as well as between A and B bursts.

This solution, however, tends to negatively impact system dynamics. Specifically, this solution changes the servo pattern, thereby impeding backward compatibility with traditional tape drives. This solution also affects the update rate of longitudinal position ("LPOS") information included in the servo pattern.

From the foregoing discussion, it should be apparent that a need exists for a system and method to limit frame spacing error during servo pattern fabrication. Beneficially, such a system and method would minimize spacing error between frames and sub-frames of a servo pattern while maintaining backward compatibility with traditional tape drives. Such a system and method are disclosed and claimed herein.

SUMMARY OF THE INVENTION

The present invention has been developed in response to the present state of the art, and in particular, in response to the problems and needs in the art that have not yet been met for limiting frame spacing error during timing-based servo pattern fabrication. Accordingly, the present invention has been developed to provide an apparatus, system and method for limiting frame spacing error during timing-based servo pattern fabrication that overcomes many or all of the above-discussed shortcomings in the art.

An apparatus to limit frame spacing error during timing-based servo pattern fabrication in accordance with the present invention may include two servo write heads. The first servo write head may be configured to simultaneously write two or more servo stripes onto a servo frame of a magnetic tape. In one embodiment, the servo stripes include a pair of servo stripes corresponding to consecutive servo bursts. In another embodiment, the servo stripes form a quadrature burst servo pattern.

Similarly, the second servo write head may be configured to simultaneously write two or more servo stripes onto a sequential servo frame of the magnetic tape. The second servo write head may write the stripes onto the next servo frame substantially concurrently with the first servo write head. As in the first servo write head, the servo stripes written by the second servo write head may include a pair of servo stripes corresponding to consecutive servo bursts, or servo stripes forming a quadrature burst servo pattern.

The first and second servo write heads may pulse a predetermined number of times to create consecutive servo bursts in sequential servo frames. In some embodiments, the first and second servo write heads may incorporate longitudinal position ("LPOS") data into one or more of the servo bursts.

A system to limit frame spacing error during timing-based servo pattern fabrication in accordance with the present invention is also presented. The system may include a tape drive to transport a magnetic tape from one reel to another, and a servo pattern write module to write a timing-based servo pattern onto the magnetic tape as it is transported between reels. The servo pattern write module may include two servo write heads to simultaneously write servo stripes onto sequential servo frames of the magnetic tape. The servo write heads may operate substantially concurrently to limit frame spacing error between the servo frames, and may pulse a predetermined number of times to simultaneously write consecutive servo bursts onto the sequential servo frames.

In some embodiments, the system further includes a tape path disposed between the reels to support the magnetic tape during transport. In other embodiments, the servo pattern write module includes more than two servo write heads, where each pair of write heads corresponds to a unique servo track on the magnetic tape.

One embodiment of a system for limiting frame spacing error during timing-based servo pattern fabrication includes a servo pattern read module to read the servo stripes on the magnetic tape. The servo pattern read module may distinguish between servo stripes written onto a first servo frame and servo stripes written onto a next servo frame, thus ensuring accurate position information. Some embodiments of a system in accordance with the present invention further include a servo pattern verification module to verify the accuracy of the timing-based servo pattern generated by the servo pattern write module.

A method in accordance with the present invention is also presented. The method in the disclosed embodiments substantially includes the steps necessary to carry out the functions presented above with respect to the operation of the described apparatus and system. In one embodiment, the method includes transporting a magnetic tape from one reel to another. While the magnetic tape is transported, servo stripes may be written onto the magnetic tape. Particularly, the magnetic tape may include servo tracks, and the servo stripes may be written onto a servo frame of a servo track. Other servo stripes may be substantially simultaneously written onto a next frame of the servo track.

In some embodiments, the method further includes reading the servo stripes and verifying that the stripes are accurately written and spaced. In other embodiments, the servo stripes may be iteratively written to create consecutive servo bursts in sequential servo frames.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

As used herein, the term "servo burst" refers to a group of servo stripes having substantially the same size and orientation, such that adjacent servo stripes within the group reside parallel to one another. Longitudinal position ("LPOS") data may be encoded into a servo burst by selectively shifting one or more of the servo stripes with respect to the others in the group. The term "servo frame" or "frame" refers to one of a repeating series of servo stripes or servo bursts, collectively forming a servo pattern.

Figure 1:
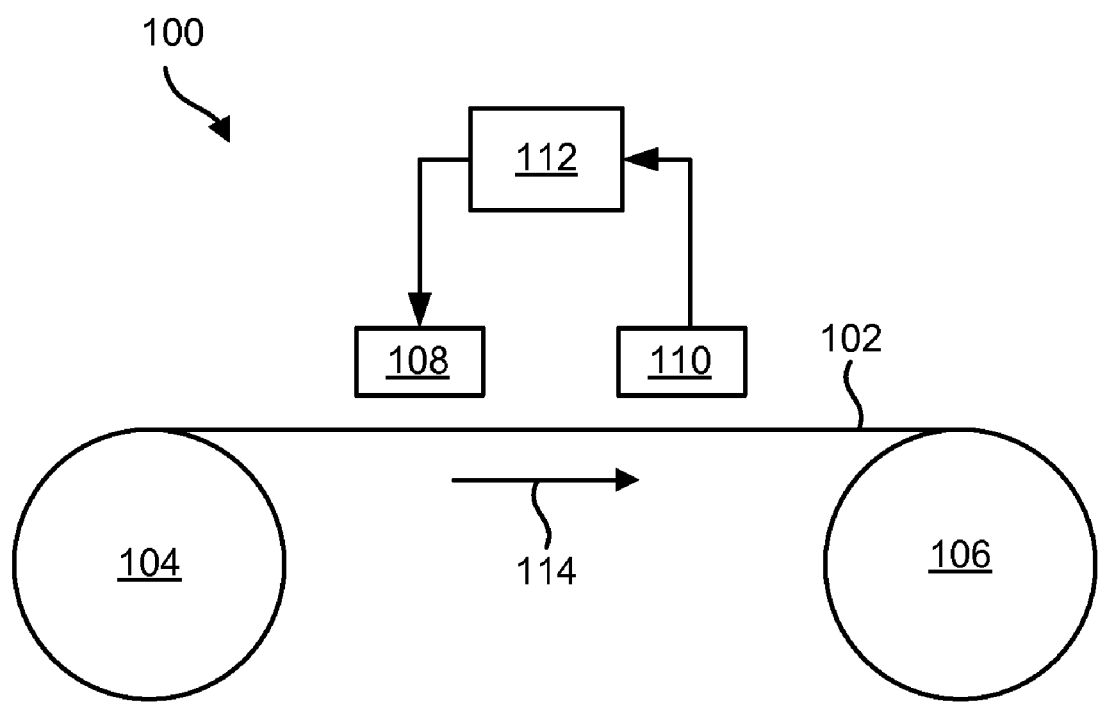
FIG. 1 is a block diagram illustrating components of a system for limiting frame spacing error during timing-based servo pattern fabrication in accordance with the present invention.

FIG. 1 depicts one embodiment of a linear tape drive system 100 that may be implemented in accordance with the present invention. The system 100 includes a magnetic tape 102, a supply reel 104, and a take-up reel 106. The magnetic tape 102 may store immense quantities of data, as well as servo information to facilitate quick and accurate recordation and retrieval of such data, as discussed in more detail with reference to FIG. 2 below.

In some cases, the magnetic tape 102 may be supported on a supply reel 104 disposed within a tape cartridge (not shown). Servo information and other data may be written to the magnetic tape 102 by buckling a leader tape (not shown) attached to the take-up reel 106 to the magnetic tape 102. Reel motors (not shown) in communication with a controller 112 may rotate one or both reels 104, 106 to spool the magnetic tape 102 in a direction 114 from the supply reel 104 to the take-up reel 106. Write heads 108 and read heads 110 positioned intermediate the supply 104 and take-up reels 106 may write to and read from the tape 102 as it is transported between reels 104, 106.

Generally, servo information must be written to the magnetic tape 102 prior to recording other data. The process for writing servo information to magnetic tape 102 is essentially identical to that for writing data to the tape 102, except for the relative positioning of read heads 110 to write heads 108. Specifically, read heads 110 utilized for data recordation are typically laterally spaced and positioned to read two servo tracks (not shown), while multiple data write heads 110 lay down an equal number of data tracks (not shown) on a data band (not shown) therebetween. In servo pattern fabrication systems, on the other hand, read heads 110 are oriented longitudinally adjacent to the write heads 108, such that the read heads 110 follow the write heads 108 along a servo track extending the length of the tape 102, and are thus able to detect errors in the servo pattern as it is written.

In a servo fabrication system, one or more servo write heads 108 and read heads 110 may communicate with the controller 112 in a feedback loop. Specifically, the controller 112 may control and selectively modify tape speed, tension, and/or position of the heads 108, 110 in response to feedback from a servo read head 110. In one embodiment, for example, servo write heads 108 may receive signals from the controller 112 to "stamp" the magnetic tape 102 at predetermined intervals to create a timing-based servo pattern. Servo read heads 110 may track the timing-based servo pattern as it is written and detect variations in formation, orientation and/or spacing of servo stripes integral to the pattern. These variations may be communicated to the controller 112, which in turn may respond by varying tape speed, tension, and/or position of the servo write and read heads 108, 110 as needed.

Figure 2:
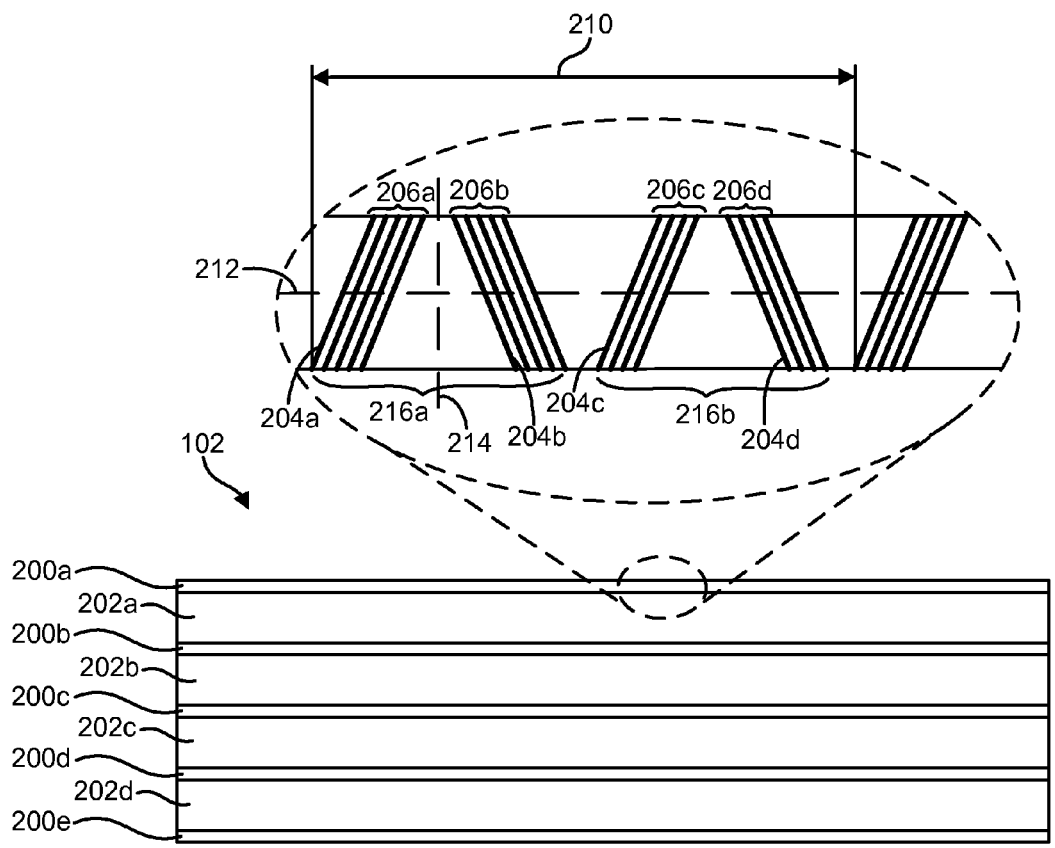
FIG. 2 is a block diagram illustrating features of a magnetic tape having a typical timing-based servo pattern written thereon.

FIG. 2 depicts a representative segment of magnetic tape 102 having servo tracks 200a-e and data bands 202a-d written thereon. As previously mentioned, individual servo tracks 200a-e are typically separated by data bands 202a-d containing multiple densely-written data tracks. In some embodiments, a magnetic tape 102 is laterally divided into four data bands 202a-d, where each data band 202a-d contains eight data tracks. Each data band 202a-d may be straddled on either side by a servo track 200a-e to facilitate data recordation and retrieval.

A servo track 200a may include recorded servo stripes 204, each servo stripe 204 being defined by two (2) magnetic transitions. A servo stripe 204 may be centered on a centerline 212, and precisely sized and positioned with respect to an adjacent servo stripe 204 to enable accurate data recordation and retrieval.

For example, a typical "A" pattern servo mark 216a includes two servo stripes 204a, 204b angled toward each other such that they resemble an "A" shape. A first servo stripe 204a of the "A" pattern servo mark 216a may be positioned precisely fifty microns (50μ) from a second servo stripe 204b at the centerline 212. A second "A" pattern servo mark 216b may be spaced a precise distance from the first "A" pattern servo mark 216a. Specifically, the first servo stripe 204a of the first "A" pattern servo mark 216a may be spaced precisely one hundred microns (100μ) from the first servo stripe 204c of the second "A" pattern servo mark 216b, measured at the centerline 212. In this manner, a tape drive system 100 may determine a position of the write and heads 198, 110 on the magnetic tape 102 based on the relative times at which servo stripes 204 are detected.

Indeed, the controller 112 may determine a latitudinal position of the read and write heads 110, 108 from timing differences between oppositely angled servo stripes 204. For example, a servo read head 110 positioned above the centerline 112 may result in a shorter time difference between detection of a first servo stripe 204a and detection of a second servo stripe 204a than where the head 110 is positioned below the centerline 112. This information may be used to correct head 110, 108 positioning as needed.

Correct head 110, 108 positioning may be further enhanced by servo burst 206 information. Servo bursts 206 may include groups of servo stripes 204 having defined spacing and positioning. A typical quadrature servo burst 206 pattern includes a burst 206a of five servo stripes 204 (the "A" burst 206a), followed by another burst 206b of five servo stripes 204 (the "B" burst 206b), followed by a burst 206c of four servo stripes 204 (the "C" burst 206c), and another burst 206d of four servo stripes 204 (the "D" burst 206d). Each of the bursts 206a, 206b of five servo stripes 204 (the "A" and "B" bursts 206a, 206b) form a first "A" pattern servo mark 216a, while each of the bursts 206c, 206d of four servo stripes 204 (the "C" and "D" bursts 206c, 206d) form a second "A" pattern servo mark 216b. By using a five burst "A" pattern servo mark 216a followed by a four burst "A" pattern servo mark 216b, a tape drive system 100 can distinguish between the two marks 216a, 216b and an inverted "A" pattern formed between the two 216a, 216b. Based on this information, the tape drive system 100 is better equipped to accurately determine read head 110 position relative to the centerline 112.

Generally, a first five burst servo mark 216a and a second four burst servo mark 216b are spaced such that a distance between the first servo stripes 204a, 204b of the first and second servo bursts 206a, 206b is equal to a distance between the first servo stripes 204b, 204c of the second and third servo bursts 206b, 206c. Accordingly, in some embodiments, a distance between the first servo stripes 204a, 204b of the first and second servo bursts 206a, 206b is fifty microns (50μ), while a distance between the first servo stripe 204a of the first servo burst 206a and the first servo stripe 204c of the third servo burst 206c is one hundred microns (100μ).

Such precise spacing between servo stripes 204 and servo bursts 206 enables the controller 112 to determine the velocity of the magnetic tape 102 by measuring the time difference between servo stripes 204 a known distance apart. Precise spacing also facilitates incorporation of longitudinal position ("LPOS") data into a timing-based servo pattern. This information enables the controller 112 to determine an absolute longitudinal position on the magnetic tape 102.

A servo write head 108 may incorporate LPOS information by shifting the position of one or more servo stripes 204 within a servo burst 206. In one embodiment, for example, the positions of a second and fourth servo stripe 204 may be shifted with respect to the other servo stripes 204 in a burst 216a of five. A shift in one direction may represent a "one," while a shift in the other direction may represent a "zero." These ones and zeros may indicate a position of the heads 108, 110 along a length of the tape 102.

The servo controller 112 may control transport of the magnetic tape 102 in response to the position and/or velocity information provided by the timing-based servo pattern. For example, the controller 112 may rotate one or both reels 104, 106 as needed to access a particular longitudinal position on the magnetic tape 102. The controller 112 may also modify the velocity of the magnetic tape 102 to match a desired velocity based on the servo pattern timing information.

Figure 3:
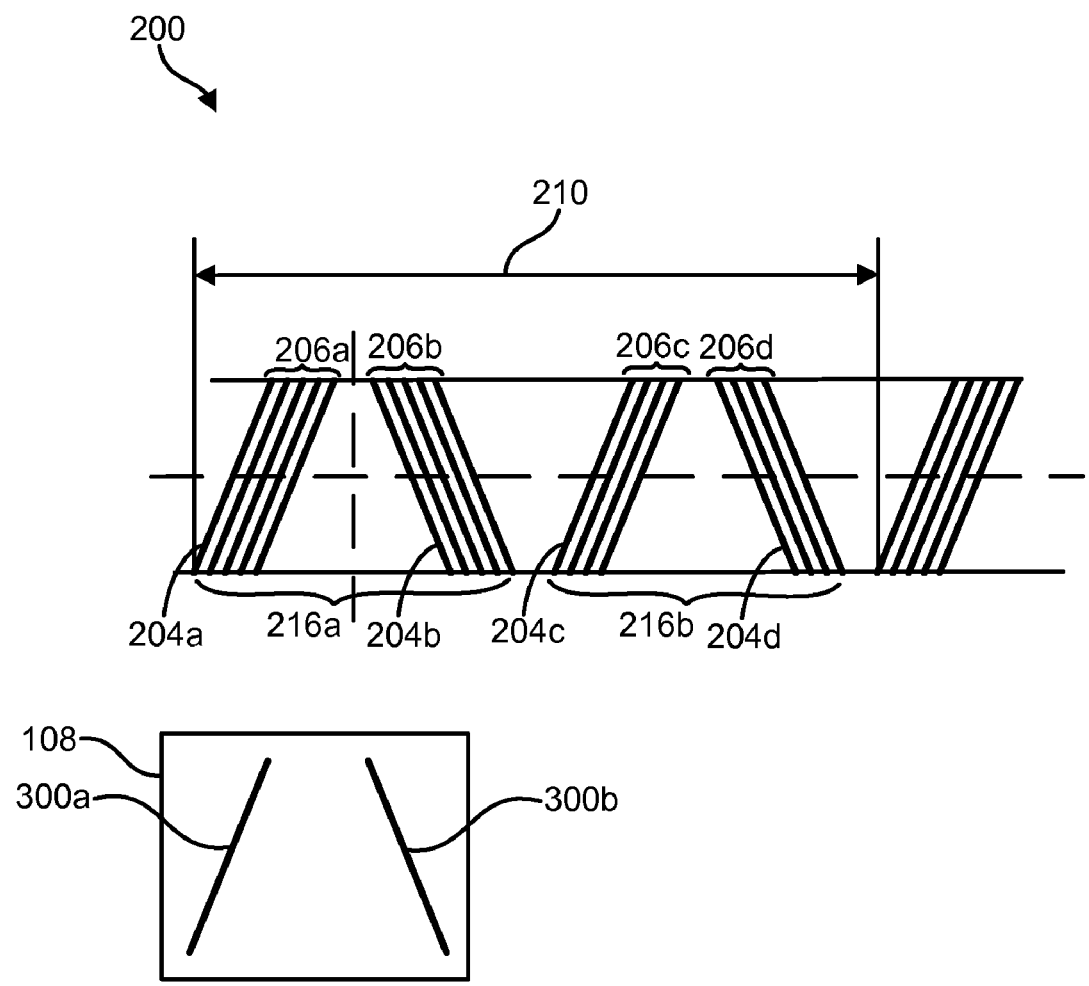
FIG. 3 is a block diagram illustrating prior art system components used to create a timing-based servo pattern.

FIG. 3 depicts one embodiment of a prior art servo write head 108 used to create a traditional timing-based servo pattern. The servo write head 108 includes two servo write elements 300a, 300b lithographically incorporated therein. The servo write elements 300a, 200b may be sized and positioned to mirror the size and orientation of opposing servo stripes 204 of a desired servo pattern. As shown in FIG. 3, for example, the first servo write element 300a may correspond to the first servo stripe 204a of a traditional "A" pattern servo mark 216a, while the second servo write element 300b corresponds to the second servo stripe 204b of the same "A" pattern servo mark 216a.

The controller 112 may actuate the write head 108 such that the write elements 300a, 300b simultaneously write the opposing servo stripes 204a, 204b to a magnetic tape 102. In some embodiments, the controller 112 may pulse the write head 108 a predetermined number of times to create opposing servo bursts 206, 206b having equal numbers of servo stripes 204 therein. To create a traditional five (5), five (5), four (4), four (4) pattern, therefore, the controller 112 may pulse the write head 108 five (5) times to create the first two bursts of five (5) stripes 204 each, and then pulse the write head 108 four (4) times to create the next two bursts of four (4) stripes 204 each.

Velocity variations during servo pattern fabrication, however, often impede the usefulness of the servo pattern resulting from this method of fabrication. Velocity variations, for example, may cause imprecise LPOS information to be included in the servo pattern. This, in turn, may undermine the ability of the controller 112 to determine head 108, 110 position and correct for errors and inaccuracies during data recordation and retrieval.

Figure 4:
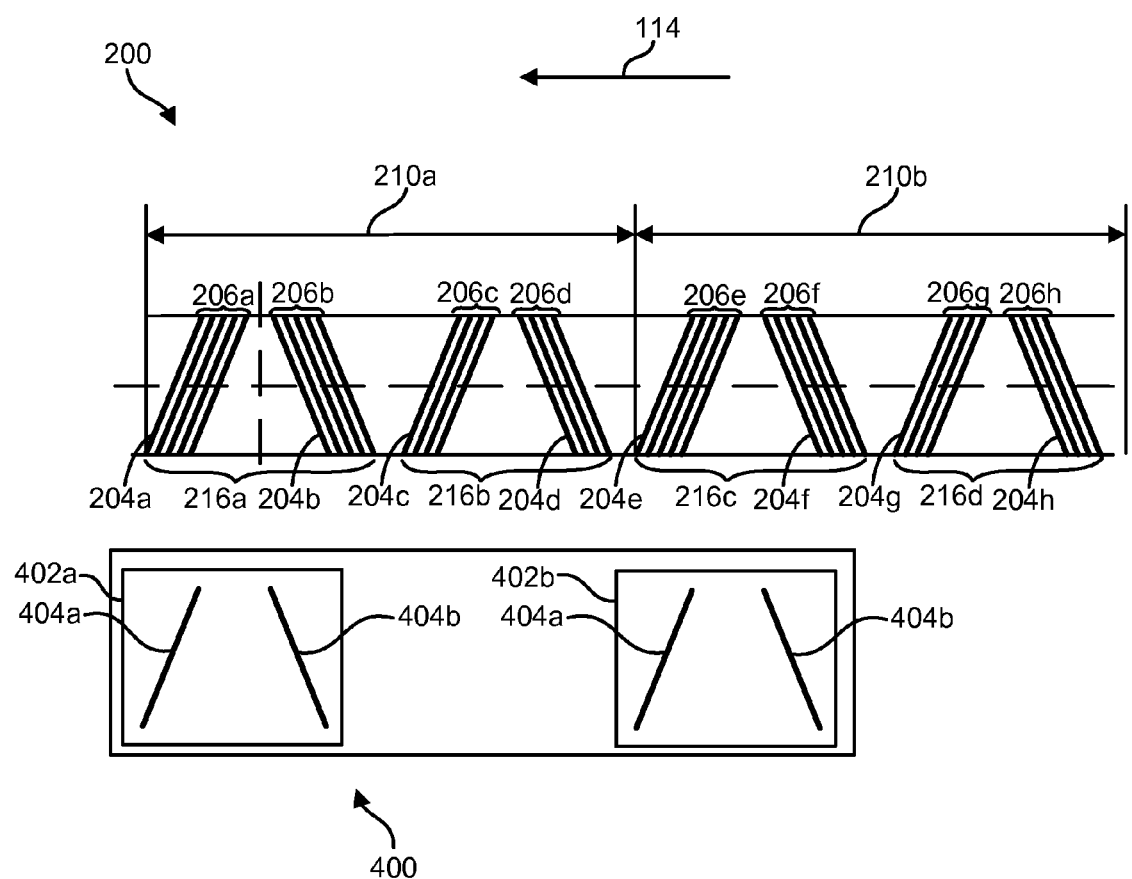
FIG. 4 is a block diagram illustrating one embodiment of an apparatus for limiting frame spacing error during timing-based servo pattern fabrication in accordance with the present invention.
Figure 5:
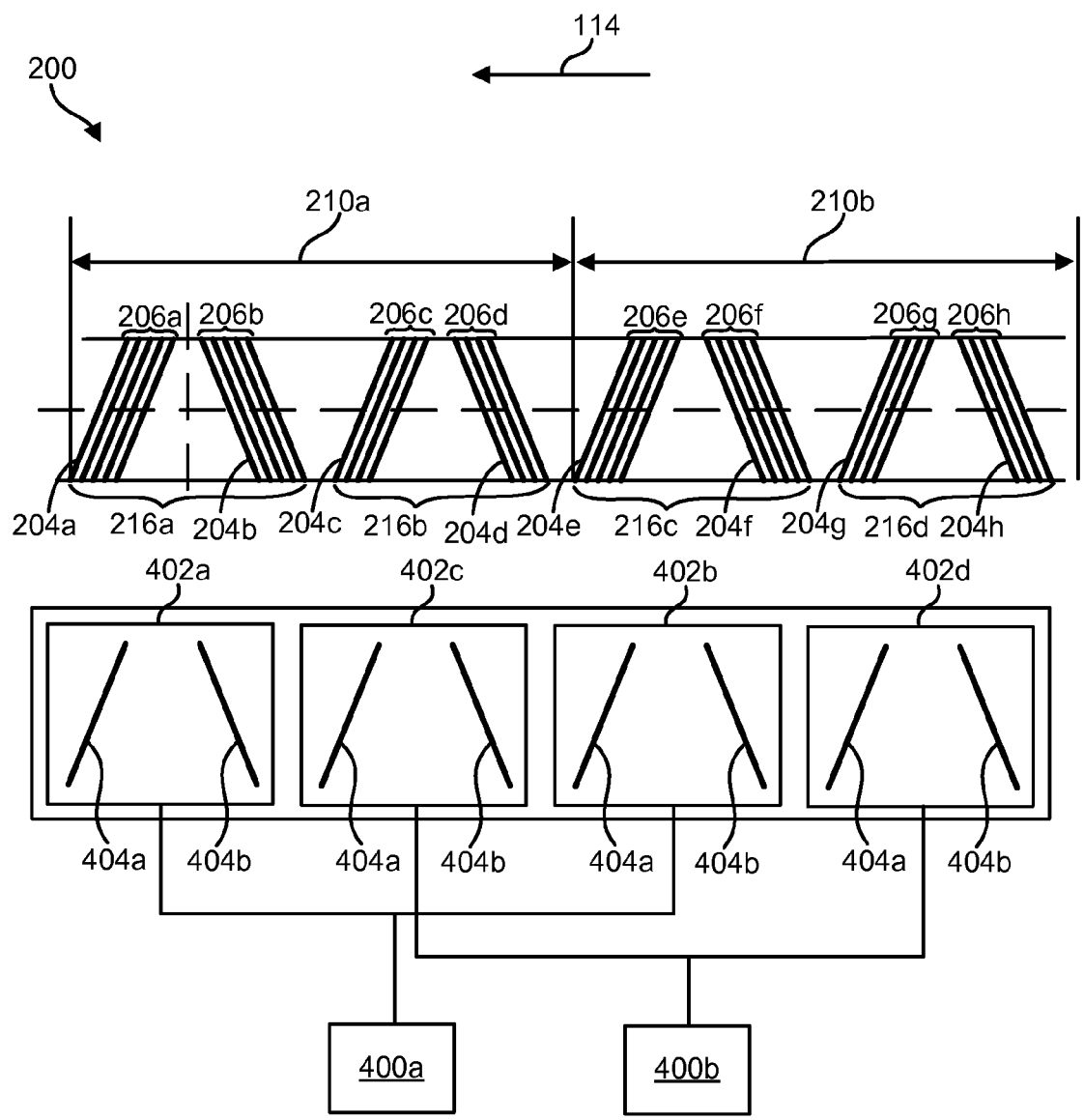
FIG. 5 is a block diagram of an alternative embodiment of an apparatus for limiting frame spacing error in accordance with the present invention.

Servo pattern errors and inaccuracies from variations in tape 102 velocity may be exacerbated where only a small portion of the servo pattern is written at one time. Referring now to FIGS. 4 and 5, the present invention aims to reduce an incidence of servo pattern and frame spacing error resulting from variations in tape 102 velocity by writing to multiple servo frames 210 at once. Embodiments of the present invention rigidly fix distances between an increased number of servo stripes 204 integral to the servo pattern, thereby reducing adverse effects of variations in tape 102 velocity on a resulting timing-based servo pattern. Moreover, embodiments of the present invention facilitate backward compatibility with traditional tape drive systems 100 as they create the same timing-based servo pattern recognized by traditional tape drive systems 100.

As illustrated in FIG. 4, one embodiment of the present invention includes a servo pattern write module 400 having two servo write heads 402a, 402b. Each of the servo write heads 402a, 402b may have two servo write elements 404a, 404b adapted to simultaneously write a first "A" pattern servo mark 216a, 216c onto sequential servo frames 210a, 210b of the magnetic tape 102.

The servo write elements 404a, 404b may be lithographically formed to a specified tolerance of less than one-hundredth micron (0.01μ). In certain embodiments, the tolerances of the servo write elements 404a, 404b may be within a range of one-hundredth micron (0.01μ) to one-tenth micron (0.1μ). Each of the servo write elements 404a, 404b may be positioned at an angle in a range between about one and about forty-five degrees (1°-45°). Accordingly, a resulting servo stripe 204 may be written onto the magnetic tape 102 at an angle in a range between about one and about forty-five degrees (1°-45°) relative to an axis perpendicular to the length of magnetic tape 102.

In some embodiments, the controller 112 may signal the servo pattern write module 400 to pulse a predetermined number of times to write first and second servo bursts 206a, 206b onto one servo frame 210a, while simultaneously writing first and second servo bursts 206e, 206f onto a sequential servo frame 210b.

As shown in FIG. 4, for example, the controller 112 may signal the servo pattern write module 400 to pulse five (5) times to write first and second servo bursts 206a, 206b, 206e, 206f of five (5) servo stripes 204 each onto each of the first and second servo frames 210a, 210b of the magnetic tape 102. The controller 112 may then signal the servo pattern write module 400 to wait for a predetermined period of time from the time that the first simultaneous bursts 206a, 206b, 206e, 206f were written. The period of time may correspond to a desired distance between the first servo stripe 204a of the first servo burst 206 and the first servo stripe 204c of the third servo burst 206c. In one embodiment, the period of time may correspond to a distance of about one hundred microns (100μ).

The controller 112 may then signal the servo pattern write module 400 to pulse four (4) times to write third and fourth servo bursts 206c, 206d, 206g, 206h of four (4) servo stripes 204 each onto each of the first and second servo frames 210a, 210b of the magnetic tape 102. Similarly, the controller 112 may signal the servo pattern write module 400 to wait for a predetermined period of time from the time that the next simultaneous bursts 206c, 206d, 206g, 206h were written. The predetermined period of time may correspond to a distance between the first servo stripe 204c of the third servo burst 206c and a first servo stripe (not shown) of a third servo frame (not shown).

Position Error Signal ("PES") information for this embodiment of the present invention may be determined by measuring a first distance ("a") between corresponding servo stripes 204a, 204b of opposing servo bursts 206a, 206b, and measuring a second distance ("c") between corresponding servo stripes 204a, 204e of simultaneously written servo bursts 206a, 206e. Where the servo pattern write module 400 bursts five (5) times to write first and second servo bursts 206a, 206b, 206e, 206f of five (5) servo stripes 204 each onto each of the first and second servo frames 210a, 210b, five (5) "a" and "c" measurements may be calculated. Velocity-independent PES information for this pattern may then be derived by dividing the sum of the five (5) "a" measurements by the sum of the five (5) "c" measurements.

In some embodiments, additional PES information may be derived from the successive four (4) burst pattern. Specifically, "a" measurements may be obtained by measuring a distance between corresponding servo stripes 204c, 204d of opposing servo bursts 206c, 206d, while "c" measurements may be obtained by measuring a distance between corresponding servo stripes 204c, 204g of simultaneously written servo bursts 206c, 206g. Velocity-independent PES information for this pattern may then be derived by dividing the sum of the four (4) "a" measurements by the sum of the four (4) "c" measurements.

Referring now to FIG. 5, alternative embodiments of the present invention may include multiple servo pattern write modules 400, each having two or more servo write heads 402 to write servo stripes 204 to multiple servo frames 210 at the same time. In one embodiment, as shown in FIG. 5, two servo pattern write modules 400a, 400b simultaneously write servo stripes 204 to sequential servo frames 210. Specifically, each servo pattern write module 400a, 400b includes two servo write heads 402a-d. Each servo write head 402a-d includes two opposing servo write elements 404a, 404b to write opposing servo stripes 204 to a magnetic tape 102.

In operation, the first servo write module 400a may receive a signal from the controller 112 to simultaneously write servo stripes 204a, 204b, 204e, 204f to sequential servo frames 210a, 210b. The second servo write module 400b may receive a signal from the controller 112 at substantially the same time as the first servo write module 400a receives its signal. The second servo write module 400b may then simultaneously write servo stripes 204c, 204d, 204g, 204h to the same sequential servo frames 210a, 210b. In this manner, frame spacing error between the sequential servo frames 210a, 210b is limited by rigidly fixing a distance between an increased number of servo write heads 402a-d.

Backward compatibility may nevertheless be achieved, however, by enabling each of the servo write modules 400a, 400b to receive different, although concurrent, signals from the controller 112. For example, the controller 112 may signal the first servo write module 400a to pulse five (5) times to create five (5) burst "A" servo pattern marks 216a, 216c in sequential servo frames 210a, 210b. The controller 112 may simultaneously signal the second servo write module 400b to pulse four (4) times to create four (4) burst "A" servo pattern marks 216b, 216d in the same sequential servo frames 210a, 210b. The four (4) burst "A" servo pattern marks 216b, 216d may be offset a fixed distance from the five (5) burst "A" servo pattern marks 216a, 216c as a result of fixed spatial relationships between servo write heads 402a-d. In this manner, embodiments of the present invention may facilitate servo pattern fabrication that is substantially unaffected by fluctuations in tape 102 velocity.

One skilled in the art will recognize, of course, that other variations of the present invention may be practiced and are contemplated herein. For example, a single servo write module 400 may control a quantity of servo write heads 402 having sufficient to create multiple servo frames 210 at once. Likewise, more than two servo write modules 400 may be implemented to simultaneously write an increased number of servo stripes 204 to an increased number of servo frames 210. Servo patterns created by the servo write module 400 may also vary. For example, servo patterns may comprise various servo stripe 204 sizes and orientations, and various quantities of servo stripes 204 may be grouped together as servo bursts 206.

Figure 6:
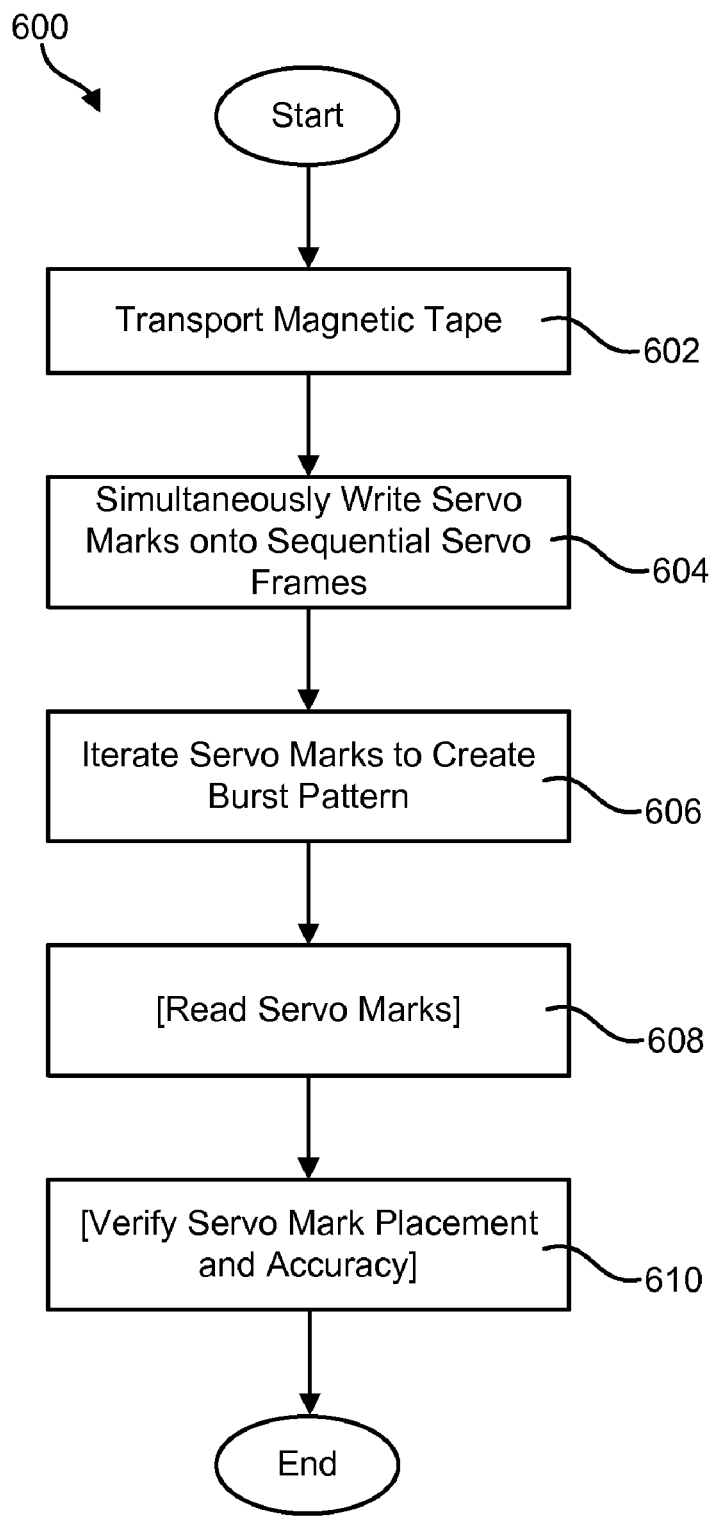
FIG. 6 is a flow chart illustrating steps in accordance with a method for limiting frame spacing error in accordance with certain embodiments of the present invention.

Referring now to FIG. 6, a method 600 to limit frame spacing error during timing-based servo pattern fabrication in accordance with embodiments of the present invention may include transporting 602 a magnetic tape from one reel to another to expose the magnetic tape for servo pattern fabrication. Servo marks may then be simultaneously written 604 onto sequential servo frames. In certain embodiments, the servo marks may be written iteratively 606 to create one or more servo burst patterns. The resulting timing-based servo pattern may then be read 608 and verified 601 to ensure accurate servo mark formation and orientation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to limit frame spacing error during timing-based servo pattern fabrication, the apparatus comprising:
   a first servo write head configured to write a first plurality of servo stripes onto a first servo frame of a magnetic tape, a servo frame comprising a portion of the magnetic tape onto which is written a pattern of servo stripes, the pattern of servo stripes repeating on each servo frame; and
   a second servo write head configured to simultaneously write, substantially concurrently with the first servo write head, a second plurality of servo stripes onto a second servo frame of the magnetic tape, wherein the second servo frame sequentially follows the first servo frame and wherein the second servo write head is maintained at a predetermined distance relative to the first servo write head such that servo stripes simultaneously written onto the first and second servo frames are spaced according to the predetermined distance between the first and second servo write heads.

2. The apparatus of claim 1, wherein each of the first and second pluralities of servo stripes comprises a pair of servo marks.

3. The apparatus of claim 2, wherein the pair of servo stripes corresponds to consecutive servo bursts.

4. The apparatus of claim 1, wherein each of the first and second pluralities of servo stripes comprises a quadrature burst servo pattern.

5. The apparatus of claim 1, wherein each of the first and second servo write heads pulses a predetermined number of times to simultaneously write consecutive servo bursts onto each of the first and second servo frames.

6. The apparatus of claim 5, wherein each of the first and second servo write heads pulses five times to simultaneously write consecutive servo bursts onto each of the first and second servo frames.

7. The apparatus of claim 5, wherein each of the first and second servo write heads pulses four times to simultaneously write consecutive servo bursts onto each of the first and second servo frames.

8. The apparatus of claim 5, wherein each of the first and second servo write heads incorporates longitudinal position ("LPOS") data into at least one of the consecutive servo bursts.

9. A system to limit frame spacing error during timing-based servo pattern fabrication, the system comprising:
   a tape drive configured to transport a magnetic tape from a first reel to a second reel; and
   a servo pattern write module positioned intermediate the first reel and the second reel and configured to write a timing-based servo pattern onto the magnetic tape as it is transported from the first reel to the second reel, the servo pattern write module comprising:
   a first servo write head configured to write a first plurality of servo stripes onto a first servo frame of the magnetic tape, a servo frame comprising a portion of the magnetic tape onto which is written a pattern of servo stripes, the pattern of servo stripes repeating on each servo frame; and
   a second servo write head configured to simultaneously write, substantially concurrently with the first servo write head, a second plurality of servo stripes onto a second servo frame of the magnetic tape, wherein the second servo frame sequentially follows the first servo frame and wherein the second servo write head is maintained at a predetermined distance relative to the first servo write head such that servo stripes simultaneously written onto the first and second servo frames are spaced according to the predetermined distance between the first and second servo write heads.

10. The system of claim 9, wherein the servo pattern write module comprises more than one first and second servo write head, each of the first and second servo write heads corresponding to a unique servo track on the magnetic tape.

11. The system of claim 10, further comprising a tape path disposed between the first reel and the second reel to support the magnetic tape during transport.

12. The system of claim 9, wherein the servo pattern write module pulses a predetermined number of times to simultaneously write consecutive servo bursts onto each of the first and second servo frames.

13. The system of claim 9, further comprising a servo pattern read module comprising at least one servo read head configured to read the first and second pluralities of servo stripes on the magnetic tape.

14. The system of claim 13, wherein the servo pattern read module is further configured to differentiate between servo stripes on the first servo frame and servo stripes on the second servo frame.

15. The system of claim 9, further comprising a servo pattern verification module to verify the accuracy of the timing-based servo pattern generated by the servo pattern write module.

16. A system limit frame spacing error during timing-based servo pattern fabrication, the system comprising:
a tape drive configured to transport a magnetic tape from a first reel to a second reel;
a first servo write head configured to write a first plurality of servo stripes onto a first servo frame of a magnetic tape, a servo frame comprising a portion of the magnetic tape onto which is written a pattern of servo stripes, the pattern of servo stripes repeating on each servo frame; and
a second servo write head configured to simultaneously write, substantially concurrently with the first servo write head, a second plurality of servo stripes onto a second servo frame of the magnetic tape, wherein the second servo frame sequentially follows the first servo frame and wherein the second servo write head is maintained at a predetermined distance relative to the first servo write head such that servo stripes simultaneously written onto the first and second servo frames are spaced according to the predetermined distance between the first and second servo write heads;
a controller that provides a control signal to the first and second servo write heads such that each of the first and second servo write heads concurrently pulses five times to simultaneously write five consecutive servo stripes forming a five-stripe servo burst onto a first portion of each of the first and second servo frames, and such that each of the first and second servo write heads pulses four times to simultaneously write four consecutive servo stripes forming a four-stripe servo burst onto a second portion of each of the first and second servo frames.

17. The system of claim 16, further comprising:
a servo read head that reads each of the servo stripes of the five-stripe servo burst and each of the servo stripes of the four-stripe servo burst; and
a verification module that verifies that the servo stripes of the five-stripe servo burst and the servo stripes of the four-stripe servo burst are accurately written and spaced.

18. A method to limit frame spacing error during timing-based servo pattern fabrication, the method comprising:
transporting a magnetic tape from a first reel to a second reel, the magnetic tape having at least one servo track;
writing with a first servo write head, while the magnetic tape is transported from the first reel to the second reel, a first plurality of servo stripes onto a first servo frame of the at least one servo track, a servo frame comprising a portion of the magnetic tape onto which is written a pattern of servo stripes, the pattern of servo stripes repeating on each servo frame; and
writing with a second servo write head, substantially simultaneously while writing the first plurality of servo stripes onto the first servo frame, a second plurality of servo stripes onto a second frame of the at least one servo track, wherein the second servo frame sequentially follows the first servo frame and wherein the second servo write head is maintained at a predetermined distance relative to the first servo write head such that servo stripes simultaneously written onto the first and second servo frames are spaced according to the predetermined distance between the first and second servo write heads.

19. The method of claim 18, further comprising:
reading each of the first and second pluralities of servo stripes; and
verifying that each of the first and second pluralities of servo stripes are accurately written and spaced.

20. The method of claim 18, wherein each of writing the first plurality of servo stripes and writing the second plurality of servo stripes comprises iteratively writing the first and second pluralities of servo stripes to create consecutive servo bursts in each of the first and second servo frames.

* * * * *